US010825235B2

(12) United States Patent
Baudel et al.

(10) Patent No.: US 10,825,235 B2
(45) Date of Patent: *Nov. 3, 2020

(54) DATA PLOT PROCESSING (71) Applicant: International Business Machines Corporation, Armonk, NY (US)

(72) Inventors: Thomas Baudel, Paris (FR); Albertus H. J. Broeksema, Ivry-sur-Seine (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,307

(22) Filed: Jun. 26, 2019

(65) Prior Publication Data

US 2019/0318531 A1 Oct. 17, 2019

Related U.S. Application Data (63) Continuation of application No. 16/040,602, filed on Jul. 20, 2018, now Pat. No. 10,395,417, which is a continuation of application No. 15/927,535, filed on Mar. 21, 2018, now Pat. No. 10,121,278, which is a continuation of application No. 13/942,904, filed on Jul. 16, 2013, now Pat. No. 10,002,458.

(30) Foreign Application Priority Data

Aug. 15, 2012 (GB) .................................. 1214542.1

(51) Int. Cl.
*G06T 15/10* (2011.01)
*G06T 11/00* (2006.01)
*G06T 19/00* (2011.01)
*G06K 9/62* (2006.01)

(52) U.S. Cl.
CPC .............. *G06T 15/10* (2013.01); *G06K 9/627* (2013.01); *G06K 9/6232* (2013.01); *G06T 11/00* (2013.01); *G06T 19/00* (2013.01); *G06T 2219/004* (2013.01)

(58) Field of Classification Search
None
See application file for complete search history.

(56) References Cited

U.S. PATENT DOCUMENTS 6,496,832 B2    12/2002    Chi et al.
6,750,864 B1    6/2004    Anwar
(Continued)

OTHER PUBLICATIONS

List of IBM Patents or Patent Applications Treated As Related, July 17, 2019.
(Continued)

*Primary Examiner* — Sarah Le
(74) *Attorney, Agent, or Firm* — Law Office of Jim Boice (57) ABSTRACT A method, system, and/or computer program product processes a data plot comprising a plurality of data points for inclusion of additional information content. A space of the data plot is divided into subspaces, where each subspace contains at least one data point of the data plot. A compressed information representation for each subspace is computed based on information about said at least one data point contained in said each subspace. The data plot is displayed with the compressed information representation for said each subspace, where each unit of compressed information is displayed, on a display, adjacent to a corresponding group of data points from the data plot.

17 Claims, 8 Drawing Sheets

(56) References Cited

U.S. PATENT DOCUMENTS

| | | | |
|---|---|---|---|
| 7,272,556 | B1 | 9/2007 | Aguilar et al. |
| 7,593,012 | B2 | 9/2009 | Ikehata et al. |
| 2002/0067358 | A1 | 6/2002 | Casari et al. |
| 2009/0106691 | A1 | 4/2009 | Ballard et al. |
| 2009/0216773 | A1 | 8/2009 | Konopnicki |
| 2009/0252436 | A1 | 10/2009 | Eidenzon et al. |
| 2009/0287503 | A1 | 11/2009 | Angell et al. |
| 2010/0169075 | A1 | 7/2010 | Raffa et al. |
| 2011/0187721 | A1 | 8/2011 | Furukawa et al. |

OTHER PUBLICATIONS

G. Ellis et al., "A Taxonomy of Clutter Reduction for Information Visualisation", IEEE Computer Society, Visualization and Computer Graphics, IEEE Transactions on, vol. 13, No. 6, Nov.-Dec. 2007, pp. 1216-1223.

E. Bertini et al., "Improving 2D Scatterplots Effectiveness Through Sampling, Displacement, and User Perception", Proceedings of the Ninth International Conference On Information Visualisation, 2005, pp. 1-9.

C. Hurter et al., "Moleview: An Attribute and Structure-Based Semantic Lens for Large Element-Based Plots", IEEE Computer Society, IEEE Transactions on Visualization and Computer Graphics, vol. 17, No. 12, Dec. 2011, pp. 2600-2609.

E. Bertini et al., "Quality Metrics for 2D Scatterplot Graphics: Clutter", Springer-Verlag, Lecture Notes in Computer Science, vol. 3031, 2004, pp. 77-89. (Abstract Only).

J. Fekete et al., "Excentric Labeling: Dynamic Neighborhood Labeling for Data Visualization", ACM, New York, NY, CHI '99, Proceedings of the SIGCHI conference on Human Factors in Computing Systems, May 1999, pp. 512-519.

Anonymous "Fortune's Algorithm" wikipedia.org, Retrieved July 16, 2013, pp. 1-3, <http://en.wikipedia.org/wiki/Fortune's_algorithm>.

UK Patent Application No. GB1214542.1: Examination Opinion dated November 29, 2012.

Koivistoinen, Heidi. Minna Ruuska, and Tapio Elomaa. "A Voronoi Diagram Approach to Autonomous Clustering." International Conference on Discovery Science. Springer Berlin Ehidelberg, 2006.

Hoang, Thai V., Salvatorre Tabbone, and Ngoc-Yen Pham. "Extraction of Nom Text Regions From Stele Images Using Area Voronoi Diagram." 2009 10th International Conference on Document Analysis and Recognition. IEEE, 2009.

ESRI, "Maple for Arcgis", An ESRI White Paper, May 2009.

Map Monkey, 2012. "Random Notes: Geographer-at-Large: Feb. 2012" Map Monkey, Posted Feb. 2012.

Keim, Daniel A., et al. "Generalized Scatter Plots." Information Visualization 9.4 (2010): 301-311.

Jeff Ullman, "Chapter 7, Clustering", Posted Dec. 16, 2010. infolab.stanford.edu.

Li, Jia. "Agglomerative Connectivity Constrained Clustering for Image Segmentation." Statistical Analysis and Data Minining 4.1 (2011): 84-99.

Wolff, Alexander, Michael Thon, and Yinfeng Xu. "A Better Lower Bound for Two-Circle Point Labeling." Algorithms and Computation. Springer Berlin Heidelberg, 2000. 422-431.

Merland, Romain, Bruno Levy, and Guillaume Caumon. "Building PEBI Grids Conforming to 3D Geological Features Using Centroidal Voronoi Tessellations." IAMG Proceedings (2011).

Jiang, Minghui, Xiaojun Qi, and Pedro J. Tejada. "A Computational-Geometry Approach to Digital Image Contour Extraction." Transactions on Computational Science XIII. Springer Berling Heidelberg, 2011. 13-43.

U.S. Appl. No. 13/942,904 Non-Final Office Action dated Nov. 20, 2015.

U.S. Appl. No. 13/942,904 Final Office Action dated Aug. 10, 2016.

U.S. Appl. No. 13/942,904 Non-Final Office Action dated Jan. 13, 2017.

U.S. Appl. No. 13/942,904 Final Office Action dated Jun. 26, 2017.

U.S. Appl. No. 15/927,535 Non-Final Office Action dated May 3, 2018.

DATA PLOT PROCESSING

This application is based on and claims the benefit of priority from Great Britain (UK) Patent Application 1214542.1, filed on Aug. 15, 2012, and herein incorporated by reference in its entirety.

This application includes a computer program listing, which is found in the Computer Program Listing Appendix filed electronically with the U.S. Patent and Trademark Office on Mar. 1, 2018. The Computer Program Listing Appendix was created on Mar. 1, 2018 and the file size is 14607 bytes. The Computer Program Listing Appendix is contained in the Supplemental Content file record on PAIR for U.S. patent application Ser. No. 13/942,904 under file name 13942904_ComputerProgramListingAppendix.txt, which is hereby incorporated by reference in its entirety.

BACKGROUND

This invention relates to processing data plots, and more particularly to processing data plots for inclusion of additional information content.

Data plots, such as scatterplots, are widely used for illustrating or finding correlations between data. Data points are positioned in a multi-dimensional space according to their values, wherein the values of a data point determine its position in the multi-dimensional space.

In order to identify data points within a data plot and provide additional information content within the data plot, labels may be used which are typically located next to a data point in the data plot. Although this labelling technique may be adequate when the number of data point is low, a data plot can quickly become visually cluttered with labels when the number of data points is increased. Thus, for a fixed available space of a 2-Dimensional plot, for example, it can be a problem to include detailed information about the data points without causing visual clutter.

Various label placement techniques are known which attempt to reduce visual clutter caused by labels in scatterplots. One such technique uses simulated annealing to avoid overlaps, whilst another uses label rotation to orientate labels at various angles in an attempt to make better use of available space. However, such known techniques fail to reduce visual clutter when the number of data points in the scatterplot is too large to display all of the required labels.

A variety of dynamic techniques are also known which require user interaction with the data plot in order to display the labels or additional information. One such dynamic approach is referred to as 'brushing' which only displays the label of a limited number of data points when the user selects a specific region (by hovering a cursor over the plot area for example). Although this approach reduces visual clutter, because only the label of a few selected data points is displayed at any one time, it also removes the other additional information content from the data plot.

SUMMARY

A method, system, and/or computer program product processes a data plot comprising a plurality of data points for inclusion of additional information content. A space of the data plot is divided into subspaces, where each subspace contains at least one data point of the data plot. A compressed information representation for each subspace is computed based on information about said at least one data point contained in said each subspace. The data plot is displayed with the compressed information representation for said each subspace, where each unit of compressed information is displayed, on a display, adjacent to a corresponding group of data points from the data plot.

BRIEF DESCRIPTION OF THE DRAWINGS

Embodiments of the present invention will now be described, by way of example only, with reference to the following drawings in which.

DETAILED DESCRIPTION

Embodiments provide a computer-implemented method of processing a data plot for inclusion of additional information content which enables the additional information to be included in the data plot whilst reducing visual clutter. Also, the additional information may be displayed in the data plot without requiring user interaction. Accordingly, there is proposed a way to label a multi-dimensional data plot (such as a scatter plot) with additional information about the data points of the data plot, wherein the available space is accounted for so as to optimise the presentation of the additional information for improved information content and reduced visual clutter.

Figure 1:
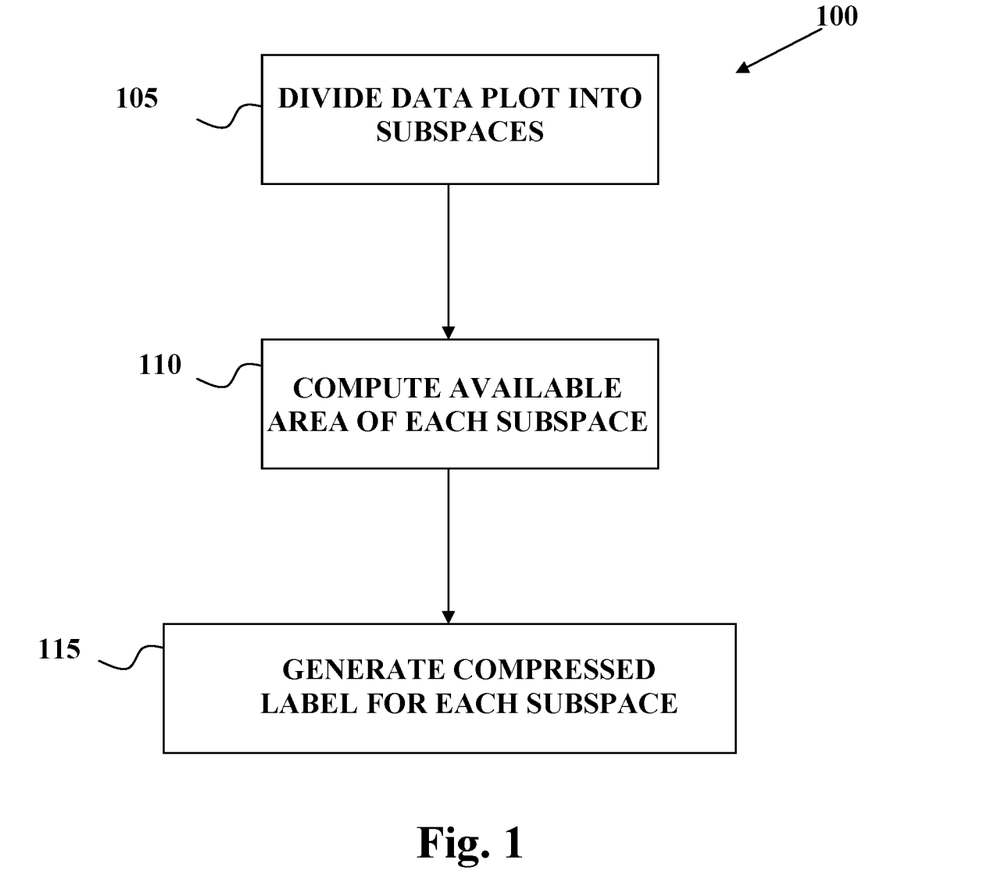
FIG. 1 is a flow diagram of a method of processing a data plot according to an embodiment of the invention.

Referring to FIG. 1, there is shown a flow diagram of a method 100 of processing a data plot according to an embodiment of the invention. The method begins with the step 105 of dividing the space of the data plot (which may be a 2-Dimensional or 3-Dimensional scatter plot, for example) into subspaces so that each subspace contains at least one data point of the data plot.

The known method of Voronoi decomposition may be used in step 105 to decompose (i.e. divide) the space of the data plot in Voronoi cells (i.e. subspaces). Voronoi decomposition is a known technique that enables the division of a multi-dimensional space into non-overlapping subspaces (which are then typically referred to as Voronoi cells). Voronoi decomposition of a given space is determined by distances to objects within the space. The objects are typically called sites or generators, and to each object a corresponding Voronoi cell is associated which is the set of all points in the given space whose distance to the object is not greater than their distance to the other objects. For example, for a 2-D scatter plot having a set of data points {d1, ..., dn}, each site may simply be a data point dk and its corresponding Voronoi cell (or Voronoi region) Rk consists of all points in the 2-D space of the scatter plot whose distance to dk it not greater than their distance to any other site (i.e. data point).

Once all of the subspaces have been defined, the method continues to step 110 in which an available area for each subspace is calculated. The available area of a subspace may be the total area of a subspace (if the whole of the area is to be made available for displaying additional information content, for example), or the available area may be a portion (defined by a shape, for example) of the subspace that is to be used to display additional information content such as a label.

Where only a portion of the subspace area is to be used to display additional information content, the available area of the subspace may be calculated by determining the maximum size of a shape (such as a rectangle, square, circle, hexagon, or a user defined irregular shape, etc. for a 2-Dimensional shape) which is centred on the barycentre of the subspace and which can fit wholly within the subspace.

Finally, in step 115, a compressed information representation is computed for each subspace based on information about the data point(s) contained in the subspace and the computed available area for the subspace. The compressed information representation for a subspace may be a label indicating the attributes of the data point(s) contained within the subspace, for example. Such a label may be compressed by displaying the information it contains in an edited or modified form that takes up less space than the unedited/unmodified form. This may be achieved by abbreviating, truncating, condensing or reducing the displayed information, either in a lossless form (i.e. in a way that does not reduce the amount of information that is portrayed by the label) or in a lossy way (i.e. in a way that reduces the amount of information portrayed by the label).

Having computed a compressed information representation for each subspace which takes account of the computed available area for the subspace, the compressed information representation for each subspace can be included in in the data plot (within its respective subspace), thus making efficient use of the available space so as to avoid visual clutter.

Turning now to FIGS. 2 through 7, an exemplary embodiment will now be described in conjunction with a 2D scatter plot.

Figure 2:
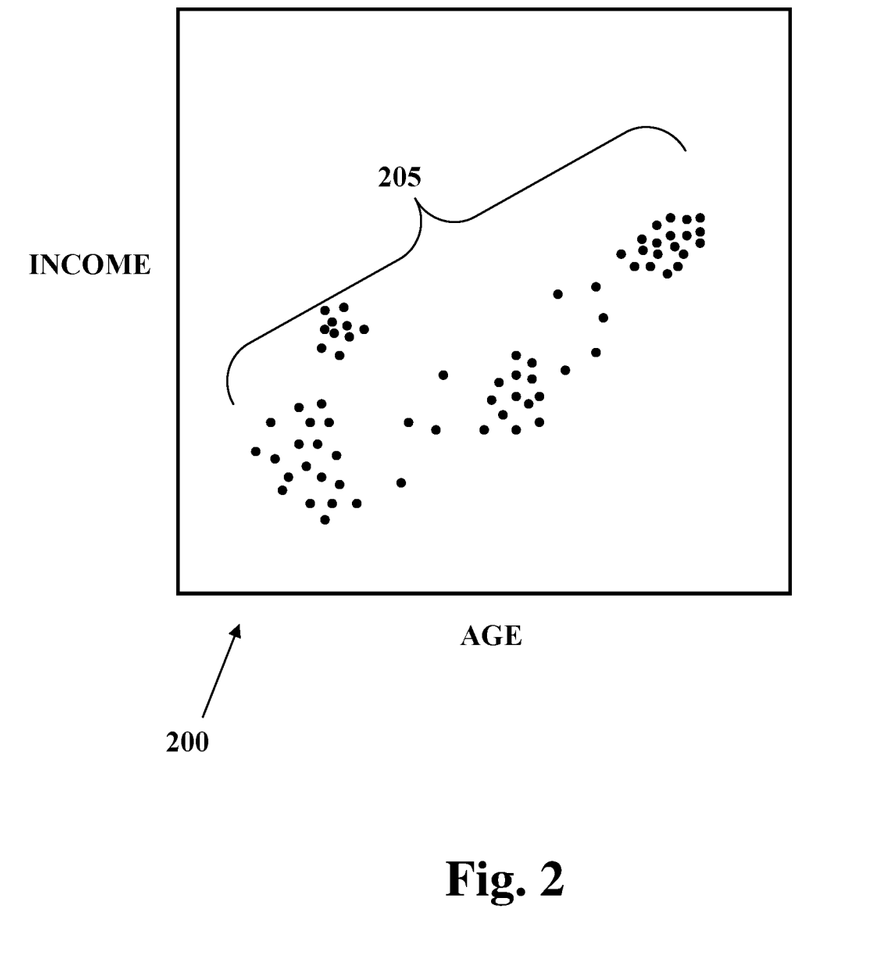
FIG. 2 shows a 2-Dimensional scatter plot of a set of data points.

FIG. 2 shows a 2-Dimensional scatter plot 200 containing a set of data points 205 each representing the age and income of a person within a sample population. In addition to such age and income data for the sample population, further data (not shown in the data plot) about the sample population is also available such as the Town/City, Car Model, and Profession of each person. This further data may be used to determine labels for the data plot.

It will be noted that FIG. 2 shows the location of each data point and no further, additional information content (such as labels, for example).

Figure 3:
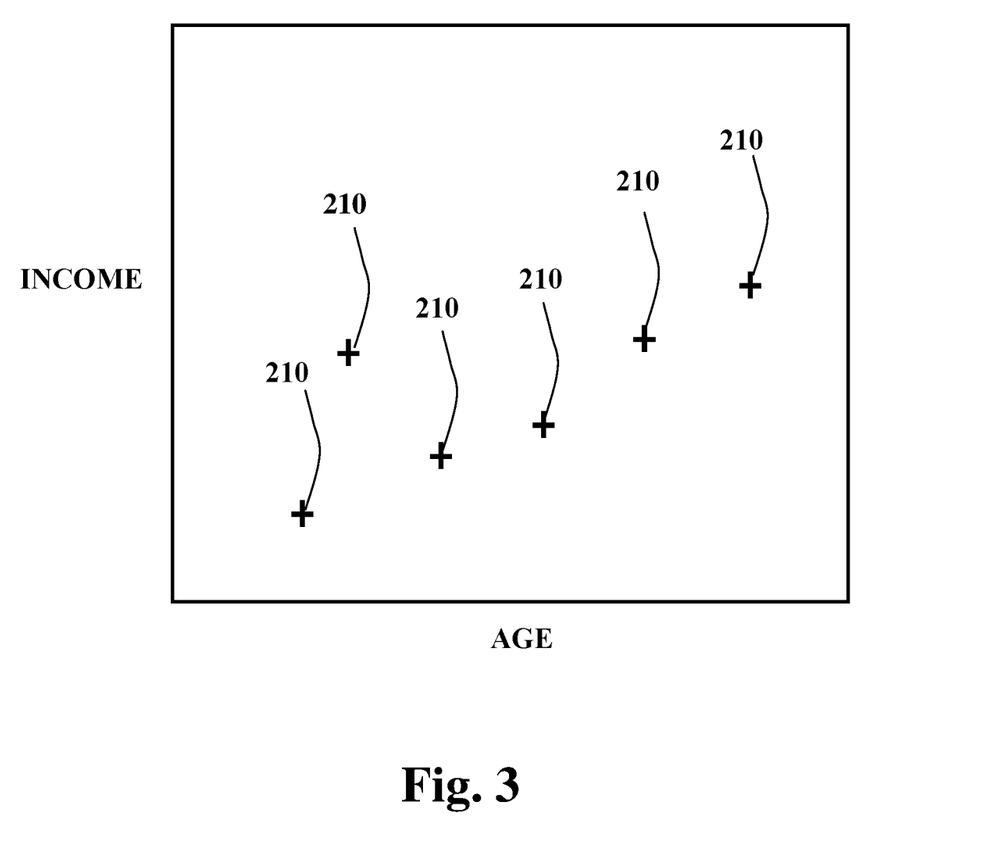
FIG. 3 shows a modification of the scatter plot of FIG. 2, wherein the data points have been merged according to an embodiment of the invention.

As illustrated in FIG. 3, the data points 205 of the 2D scatter plot 200 of FIG. 2 are then clustered or merged together according to their Euclidean distance from a neighbouring data point. In other words, closely-spaced data points (i.e. those separated by a distance less than a predetermined threshold value) are merged together to form a new merged data point 210. In an embodiment, the new merged data point is positioned at the barycentre of the merged data points. Such merged data points 210 for the 2D scatter plot of FIG. 2 are illustrated in the 2D scatter plot of FIG. 3.

Figure 4:
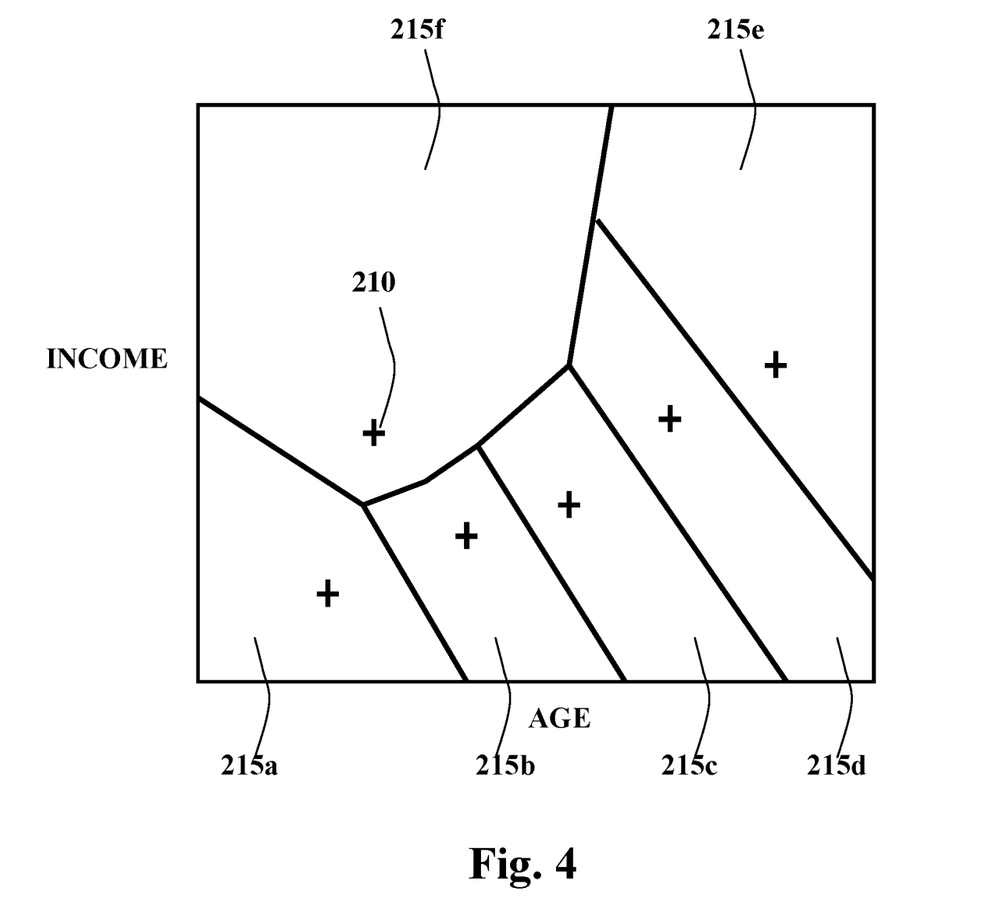
FIG. 4 shows a modification of the scatter plot of FIG. 3, wherein the scatter plot has been divided into Voronoi cells using Voronoi decomposition according to an embodiment of the invention.

Next, as shown in FIG. 4, the 2D scatter plot is divided into Voronoi cells 215a-215f (i.e. subspaces) with each merged data point 210 of FIG. 3 serving as a Voronoi site. The resultant Voronoi cells 215a-215f from dividing the plot of FIG. 3 in this way are illustrated in FIG. 4.

Figure 5:
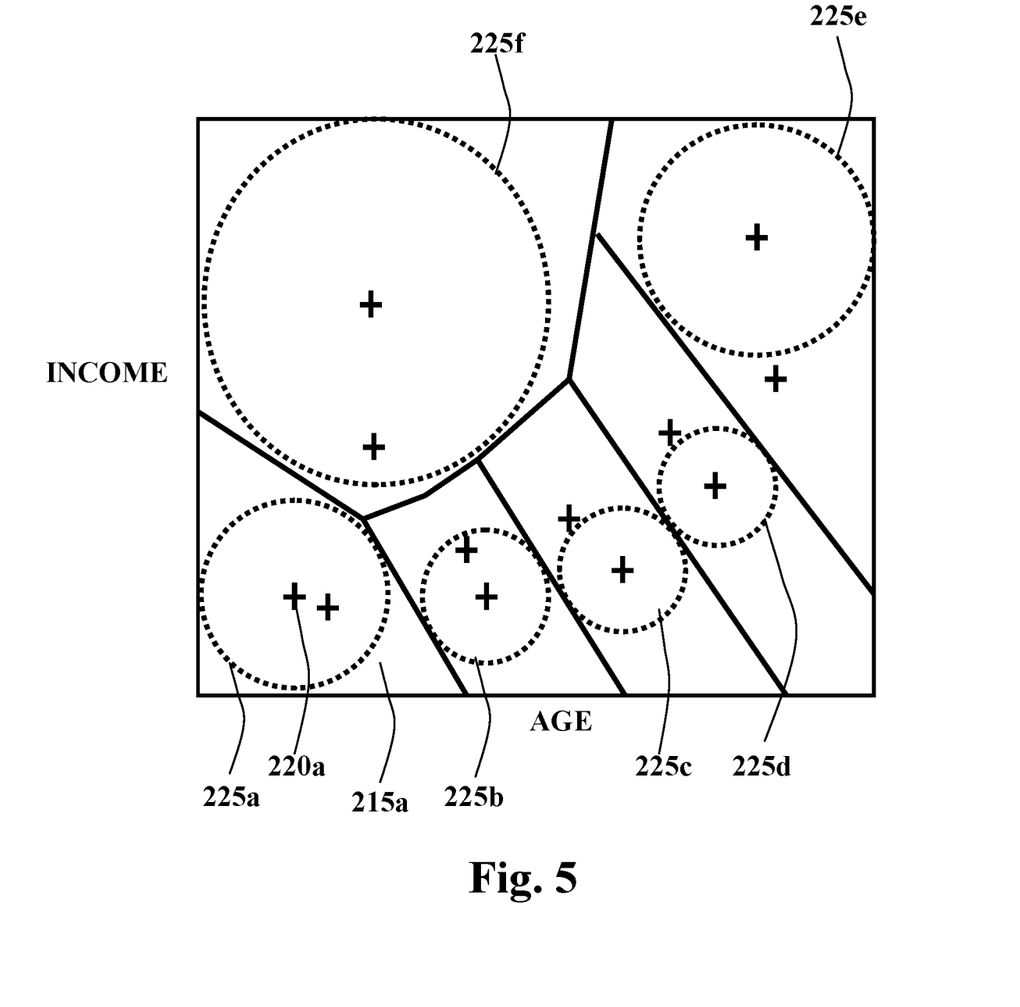
FIG. 5 illustrates the step of determining an available space of each Voronoi cell of FIG. 4 according to an embodiment, wherein the available area is based on the maximum size of a circle centred at the barycentre of the cell.
Figure 6:
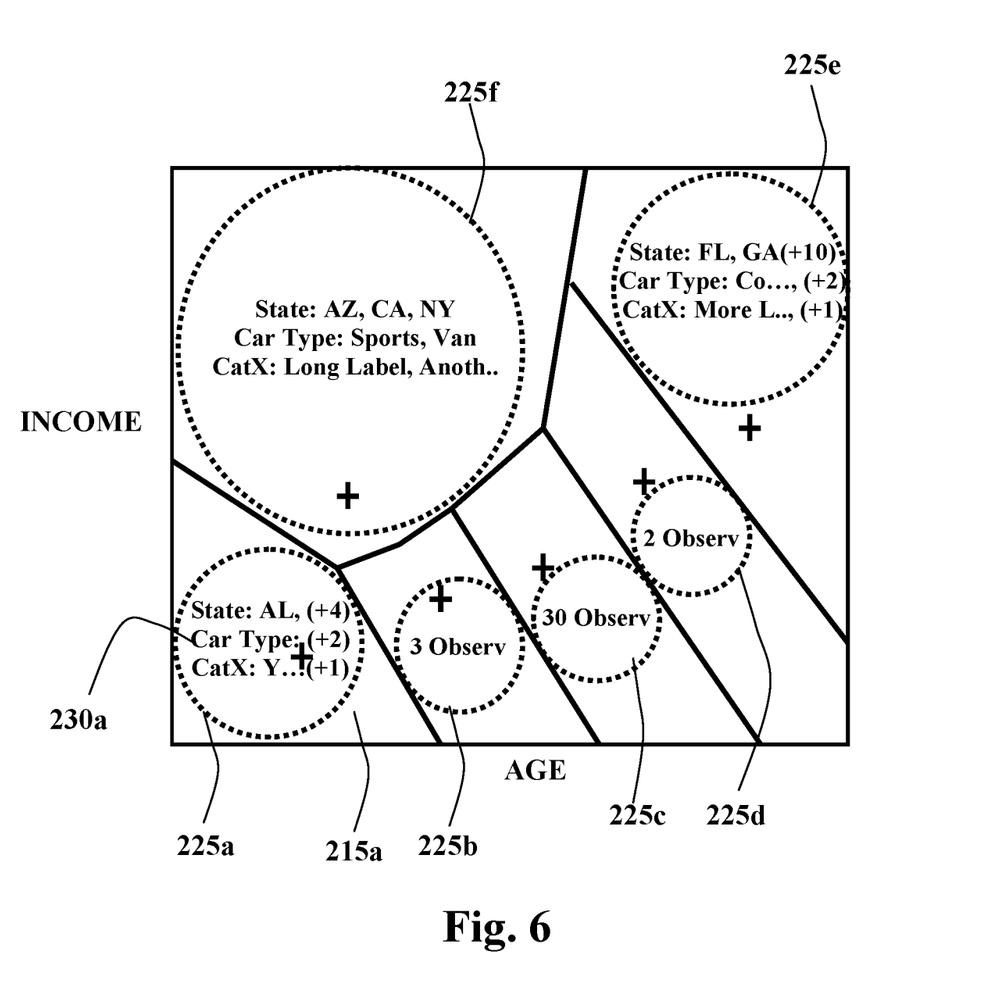
FIG. 6 illustrates the step of determining a compressed information representation for each Voronoi cell of FIG. 4 according to an embodiment, wherein the compressed information representation is based on the determined available space of a circle of FIG. 4.

For each Voronoi cell 215a-215f of FIG. 4, the available area is then computed by determining the maximum size of a circle (centred at the barycentre of the cell) that can fit within the cell. As shown in FIG. 5, this is done by first determining the barycentre 220a of a Voronoi cell 215a and then determining the maximum circle size 225a that fits within the cell 215a with the circle 225a centred at the barycentre 220a of the cell. As shown in FIG. 6, these circles 225a-225f are used to determine the maximum size of a compressed information representation (such as a label) that can be fitted with a cell, and thus the amount of information (e.g. text) that may portrayed in a cell.

Based on the determined maximum size and the data point(s) contained with a cell 215a, a label 230a for the cell is calculated. This may be done by firstly generating a label 230a from information about the data point(s) contained in the cell 215a, and then determining if the size of the label 230a fits within the computed available area for the cell 215a, and if it does not fit within the computed available area for the cell 215a, compressing the label to generate a new compressed label. The process of checking to see if the compressed label fits within the available space, and then further compressing the label if it does not fit, can be repeated until the label fits within the available space.

Initial compression begins with editing the information of the label in lossless way which reduces its size but does not reduce the amount of information it portrays. By way of example, the label may be edited by abbreviating or condensing the displayed information, or repeated/identical information may be replaced with a single entity that indicates the number of occurrence of the information (e.g. label, label→label(2)). Also, information sharing a common attribute may be replaced with a single entity that indicates the common attribute (e.g. income: low(2), income: average (3)→income: low(2), average(3)).

If such lossless compression techniques do not adequately reduce the label size, lossy compression is then used so as to further reduce the size of the label. For example, the label may be edited by truncating or reducing the displayed information (e.g.: income: low(2), average(3)→income: 2 c,5 items). Also, the label size may be further reduced by reducing the amount of information it displays to a minimum, such as a count of the data points contained in the cell (e.g. income: low(2), average(3)→5 items).

Figure 7:
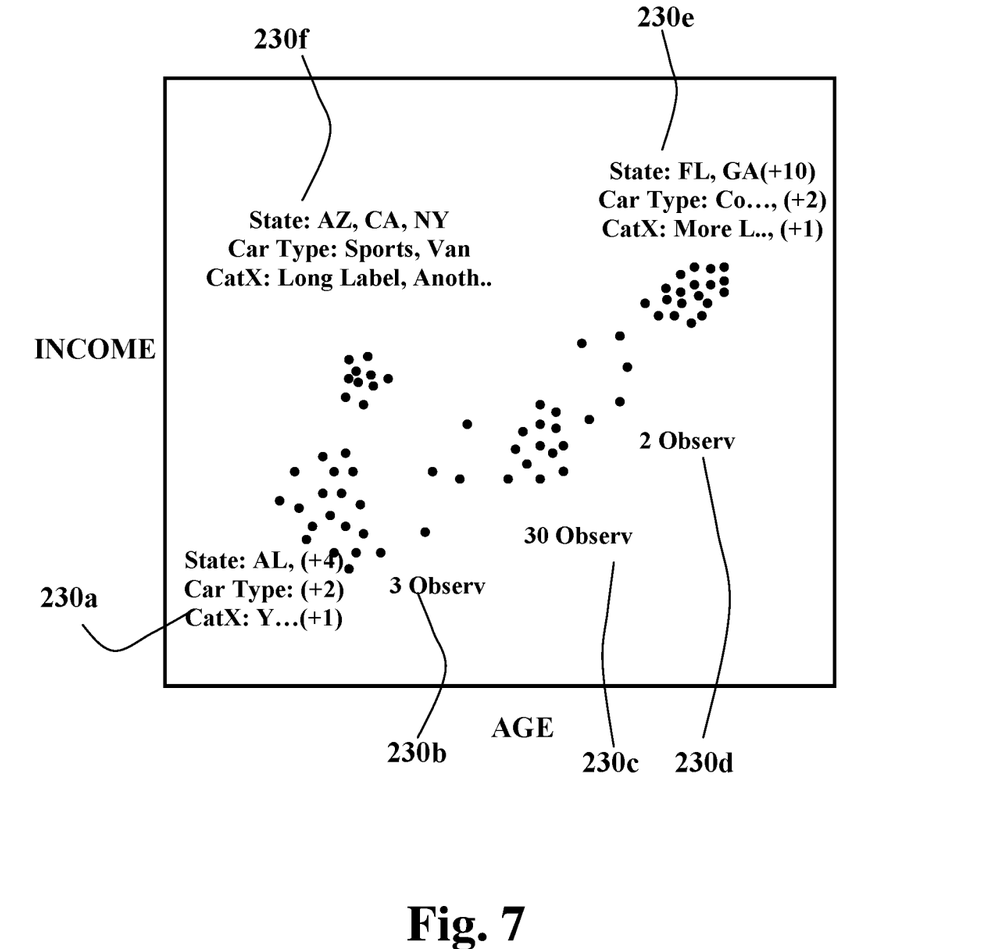
FIG. 7 shows the scatter plot of FIG. 2 modified to included additional information content in accordance with an embodiment of the invention, wherein the additional information content is displayed based on the compressed information representation for each Voronoi cell as illustrated in FIG. 6.

Finally, as shown in FIG. 7, the calculated label 230a-230f for each cell is included in the original scatter plot of FIG. 2. These labels provide a user with additional information content about the various areas of importance in the scatter plot. Here, it is noted that all of the labels contain information relating to all of the data points in the scatter plot, yet the labels do not overlap and the scatter plot is not visually cluttered.

Successive compression of a compressed information representation into a more compact form by first preserving information, and then losing information if further compression is required, helps to ensure efficient use is made of available space in a data plot. It will be appreciated, however, that other compression techniques to reduce the size of a compressed information representation may be employed, and that a preferred compression technique may depend on the type of compressed information representation for example.

Although the above described exemplary embodiment has been detailed as using the step of clustering/merging closely spaced data points based on Euclidean distance, other clustering techniques may be employed, such as those employing k-means, k-nearest neighbours, etc.

Also, other embodiments may not include such clustering or merging of data points before splitting the space of the data plot into subspaces.

For example, an alternative embodiment may employ Voronoi decomposition with each of the data points of the plot serving as a Voronoi site. Each data point will then have a corresponding Voronoi cell, and for closely spaced data points it will be appreciated that such Voronoi cells will be small in size. If a Voronoi cell is too small to accommodate a compressed information representation (such as a label) of a minimum size (in other words, too small to accommodate an elementary label portraying a predetermined minimum amount of information), the cell may be merged with its nearest neighbour to create a new cell having a site location determined by the barycentre of the merged cells. Such merging of closest neighbour may be repeated until the newly formed cell has an area greater than a predetermined minimum size for accommodating a compressed information representation.

Information relating to the data points of each merged cell may be accumulated so as to retain information for the resultant merged cell.

It will be understood that this process of repeatedly merging cells based on their size can be applied until all cells are sufficiently large to accommodate at least a minimum sized label.

Figure 8:
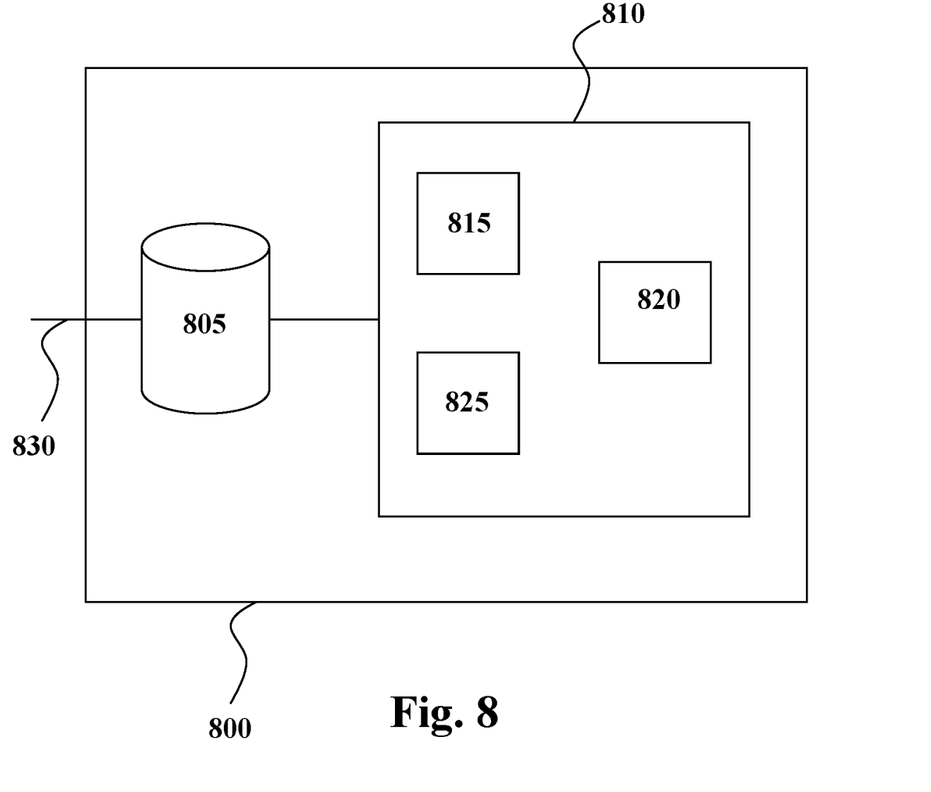
FIG. 8 illustrates a schematic block diagram of a system according to an embodiment of the invention.

Referring now to FIG. 8, there is illustrated a schematic block diagram of a system 800 according to an embodiment. The system 800 is adapted to process a data plot for inclusion of additional information content, and the system comprises a data storage unit 805 connected to a data plot processing unit 810. The data plot processing unit 810 comprises: a data plot dividing unit 815 adapted to divide the space of the data plot into subspaces; an area calculating unit 820 adapted to compute an available area for each subspace; and a label computing unit 825 adapted to compute a compressed information representation for each subspace based on information about the data point(s) contained in the subspace and the computed available area for the subspace.

The data storage unit 805 comprises data storage unit means (such as a hard-disk drive, flash memory, RAM, EEPROM or any other suitable volatile or non-volatile memory suitable for storing data) that is adapted to store one or more data plots. By way of example, a data plot may be stored as a set of data points along with an indication of their respective units of measurement. Other additional data regarding the data points and/or the region of space within which the data points may be positioned may also be stored so as to provide additional information. The data plots may be pre-loaded on the data storage means or they may be added/removed to/from the data storage unit 805 at any time via an Input/Output (I/O) interface 830 provided by the system 800.

The data plot processing unit 810 is connected to the data storage unit 810 so as to have access to data stored by the data storage unit 810. In this way, the data plot processing unit 810 can obtain information regarding a data plot for processing. Using information obtained from the data storage unit 810, the data plot dividing unit 815 of the data plot processing unit 810 divides the space of the data plot into subspaces (for example, by employing computer program code implementing a Voronoi-based decomposition method).

The area calculating unit 820 then computes an available area for each subspace defined by the data plot dividing unit 815 (for example, by employing computer program code implementing a method that determines the maximum size of a regular shape, such as a rectangle, square, circle, hexagon, etc. which fits wholly within the subspace whilst being centred on the barycentre of the subspace). Thus, the area calculating unit 820 is adapted to determine an actual space available for a compressed information representation within a subspace of the data plot.

The label computing unit 825 then calculates a compressed information representation for each subspace based on information about the data point(s) contained in the subspace (obtained from the data storage unit 805) and the computed available area for the subspace (calculated by the area calculating unit 820). By way of example, the label computing unit 825 may employ a piece of code that uses the computed available area for a subspace and properties of the data point(s) contained in the subspace to calculate a text representation which summarise information about the data point(s) within the subspace. The calculated compressed information representation may then be provided to the I/O interface via the data storage unit 805 for display.

The processing unit may be further adapted to implement a set of instructions which combines calculated compressed information representations with the data plot so that the data plot can be displayed with the additional information content provided by the compressed information representations. Such processed data plots may be stored by the data storage unit 805 and/or output via the I/O interface 830.

It will be understood that the proposed embodiments implement a processing method for multidimensional data plots which computes a space-efficient representation of information about data point of the plots. The representation of the information may be a label, and such a label may be a compressed textual representation of information relating to the data points. These text representations may be first compressed without losing information then, if still too large, lossy compression techniques may be employed to further compress the label. Embodiments may therefore make maximal use of available space with a plot to display additional information content.

Embodiments may be captured in a computer program product for execution on the processor of a computer, e.g. a personal computer or a network server, where the computer program product, if executed on the computer, causes the computer to implement the steps of a method according to an embodiment, e.g. the steps as shown in FIG. 1. Since implementation of these steps into a computer program product requires routine skill only for a skilled person, such an implementation will not be discussed in further detail for reasons of brevity only. Nonetheless, by way of example, the code of a prototype implementation employing javascript may be implemented as shown in the Computer Program Listing Appendix file named 13942904_ComputerProgramListingAppendix.txt recorded in U.S. patent application Ser. No. 13/942,904 as referenced above.

As described herein and according to one embodiment of the present invention, there is provided a method of processing a data plot comprising a plurality of data points for inclusion of additional information content, the method comprising the steps of: dividing a space of the data plot into subspaces, each subspace containing at least one data point of the data plot; computing an available area for each subspace; and computing a compressed information representation for each subspace based on information about the least one data point contained in the subspace and the computed available area for the subspace. Embodiments may therefore enable the inclusion of additional information content within a multi-dimensional data plot whilst reducing visual clutter and/or optimising the amount of additional information included.

The space of the data plot may be divided into non-overlapping subspaces using Voronoi decomposition, wherein, for each subspace, the Voronoi site for the subspace is based on at least one data point contained in the subspace. Voronoi decomposition is a known method that enables the division of a multi-dimensional space into subspaces based on points located in this space, and thus may be applicable to 2-Dimensional data plots or 3-D dimensional plots, for example.

If the size of a subspace is smaller than a predetermined value, the subspace may be merged with a neighbouring subspace so as to create a new (larger) subspace. This merging process may be repeated until the created subspace is large enough to display a minimum amount of additional information content, such a label containing a single piece of information about the data point(s) within the subspace.

The available area of a subspace may be computed based on the maximum size of a shape that can fit within the subspace, wherein the shape is centred on the barycentre of the subspace. The shape may be a regular shape or an irregular shape defined by a user.

Computing a compressed information representation for each subspace may comprise the step of: generating a compressed information representation from the information about the least one data point contained in the subspace; determining if the size of the compressed information representation fits within the computed available area for the subspace; and if it does not fit within the computed available area for the subspace, further compressing the compressed information representation to generate a new compressed information representation.

The step of compressing may comprise determining if repetition exists within the information about the least one data point contained in the subspace and, if repetition is determined to exist, representing the repeated information with a single object in the compressed information representation, the single object indicating the number of repetitions of the repeated information.

Alternatively, or in addition, the step of compressing may comprise, determining if information within the information about the least one data point contained in the subspace shares a common attribute and, if a common attribute is determined, representing the information sharing the common attribute with a single entity in the compressed information representation, the single entity indicating the common attribute.

The step of compressing may comprise the step of editing the compressed information representation to be smaller in size by reducing an amount of information displayed by the compressed information representation.

The step of compressing may comprise the steps of: determining the number of data points contained in the subspace; and editing the compressed information representation so that it represents the determined number of data points contained in the subspace.

According to another aspect of the invention there is provided a computer program product for processing a data plot for inclusion of additional informative content, the computer program product comprising a computer-readable storage medium having computer-readable program code embodied therewith, the computer-readable program code configured to: divide the space of the data plot into subspaces, each subspace containing at least one data point of the plot; compute an available area for each subspace; and compute a compressed information representation for each subspace based on a set of information to be displayed and the computed available area for the subspace.

According to another aspect of the invention, there is provided a system adapted to process a data plot comprising a plurality of data points for inclusion of additional information content, the system comprising: a computer program product according to the invention; and one or more processors adapted to perform all of the steps of a method according to the invention.

It will be understood that the above code is purely exemplary and should not be taken as limiting in any way. Other implementations may employ entirely different code and/or different programming languages.

In an embodiment, the computer program product is stored on a computer-readable medium. Any suitable computer-readable medium, e.g. a CD-ROM, DVD, USB stick, memory card, network-area storage device, internet-accessible data repository, and so on, may be considered.

Various modifications will be apparent to those skilled in the art.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   dividing, by one or more processors, a space of a data plot into subspaces, wherein each subspace contains at least one data point of the data plot;
   computing, by one or more processors, a compressed information representation for each subspace of the data plot based on information about said at least one data point contained in said each subspace;
   displaying, by one or more processors, the data plot with the compressed information representation for said each subspace, wherein each unit of compressed information is displayed, on a display, adjacent to a corresponding group of data points from the data plot;
   generating, by one or more processors, a compressed information representation from the information about said at least one data point contained in said each subspace;
   determining, by one or more processors, if a size of the compressed information representation fits within a computed available area for said each subspace; and
   in response to the compressed information representation failing to fit within the computed available area for said each subspace, further compressing, by one or more processors, the compressed information representation to generate a new compressed information representation.

2. The method of claim 1, wherein the compressed information representation is a label that describes multiple data points within a particular Voronoi cell, and wherein the method further comprises:
   determining, by one or more processors, a maximum size of the label that can be fitted within a circle that is bound by the particular Voronoi cell on the display; and
   in response to determining that the label for the multiple data points in the particular Voronoi cell cannot be fitted within the circle, compressing, by one or more processors, the label to create a lossy label that does not describe all information found in the compressed information representation.

3. The method of claim 1, further comprising:
in response to a size of a smaller subspace from said subspaces being smaller than a predetermined value, merging, by one or more processors, said smaller subspace with a neighboring subspace.

4. The method of claim 3, further comprising:
identifying, by one or more processors, subspaces that have a size smaller than the predetermined value; and
merging, by one or more processors, the subspaces determined to have the size smaller than the predetermined value with neighboring subspaces, wherein an order of merging subspaces is based on a size of the subspaces to be merged.

5. The method of claim 4, wherein the subspaces are merged in order of ascending size.

6. The method of claim 1, further comprising:
in response to a separation of two data points in the data plot being less than a predetermined value, merging, by one or more processors, the two data points into a new merged data point; and
defining and displaying, by one or more processors, a merged data point subspace in the space, wherein the merged data point subspace contains the new merged data point.

7. The method of claim 1, further comprising:
determining, by one or more processors, if repetition exists within the information about the multiple data points contained in said each subspace and, if repetition is determined to exist, representing the repeated information with a single object in the compressed information representation, the single object indicating a number of repetitions of the repeated information.

8. The method of claim 1, further comprising:
determining, by one or more processors, if information within the information about said at least one data point contained in said each subspace shares a common attribute; and
in response to determining that information within the information about said at least one data point contained in said each subspace shares the common attribute, representing, by one or more processors, the information that shares the common attribute in the compressed information representation.

9. The method of claim 1, further comprising:
editing, by one or more processors, the compressed information representation to be smaller in size by reducing an amount of information displayed by the compressed information representation.

10. The method of claim 1, further comprising:
determining, by one or more processors, a quantity of data points contained in said each subspace; and
editing, by one or more processors, the compressed information representation so that said compressed information representation represents a determined number of data points contained in said each subspace.

11. A computer program product for processing a data plot comprising a plurality of data points for inclusion of additional information content, the computer program product comprising a non-transitory computer readable storage medium having program code embodied therewith, the program code executable by a processor to perform a method comprising:

dividing a space of a data plot into subspaces, wherein each subspace contains at least one data point of the data plot;
computing a compressed information representation for each subspace of the data plot based on information about said at least one data point contained in said each subspace, wherein the compressed information representation is a label that describes multiple data points within a particular Voronoi cell;
displaying the data plot with the compressed information representation for said each subspace, wherein each unit of compressed information is displayed, on a display, adjacent to a corresponding group of data points from the data plot;
determining a maximum size of the label that can be fitted within a circle that is bound by the particular Voronoi cell on the display; and
in response to determining that the label for the multiple data points in the particular Voronoi cell cannot be fitted within the circle, compressing the label to create a lossy label that does not describe all information found in the compressed information representation.

12. The computer program product of claim 11, wherein the method further comprises:
in response to a size of a smaller subspace from said subspaces being smaller than a predetermined value, merging said smaller subspace with a neighboring subspace.

13. The computer program product of claim 11, wherein the method further comprises:
in response to a separation of two data points in the data plot being less than a predetermined value, merging the two data points into a new merged data point.

14. The computer program product of claim 11, wherein the method further comprises:
generating the compressed information representation from the information about said at least one data point contained said each subspace;
determining if a size of the compressed information representation fits within a computed available area for said each subspace; and
in response to the compressed information representation failing to fit within the computed available area for said each subspace, further compressing the compressed information representation to generate a new compressed information representation.

15. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
dividing a space of a data plot into subspaces, wherein each subspace contains at least one data point of the data plot;
computing a compressed information representation for each subspace of the data plot based on information about said at least one data point contained in said each subspace, wherein the compressed information representation is a label that describes multiple data points within a particular Voronoi cell;
displaying the data plot with the compressed information representation for said each subspace, wherein each unit of compressed information is displayed, on a display, adjacent to a corresponding group of data points from the data plot;

determining a maximum size of the label that can be fitted within a circle that is bound by the particular Voronoi cell on the display; and in response to determining that the label for the multiple data points in the particular Voronoi cell cannot be fitted within the circle, compressing the label to create a lossy label that does not describe all information found in the compressed information representation.

16. The computer system of claim 15, wherein the method further comprises:

in response to a size of a smaller subspace from said subspaces being smaller than a predetermined value, merging said smaller subspace with a neighboring subspace.

17. The computer system of claim 16, wherein the method further comprises:

identifying subspaces that have a size smaller than the predetermined value; and merging the subspaces determined to have the size smaller than the predetermined value with neighboring subspaces, wherein an order of merging subspaces is based on a size of the subspaces to be merged.

* * * * *